United States Patent
Subramanian et al.

(10) Patent No.: US 6,915,305 B2
(45) Date of Patent: Jul. 5, 2005

(54) RESTRUCTURING VIEW MAINTENANCE SYSTEM AND METHOD

(75) Inventors: Narayana Subramanian, San Jose, CA (US); Shivakumar Venkataraman, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 09/930,568

(22) Filed: Aug. 15, 2001

(65) Prior Publication Data

US 2003/0046292 A1 Mar. 6, 2003

(51) Int. Cl.[7] ............................................. G06F 17/00
(52) U.S. Cl. ....................................................... 707/102
(58) Field of Search ............................... 707/102, 100, 707/1, 2, 3, 5; 711/100

(56) References Cited

U.S. PATENT DOCUMENTS

| | | | |
|---|---|---|---|
| 5,317,729 A | 5/1994 | Mukherjee et al. ............ | 707/1 |
| 5,379,419 A | 1/1995 | Heffernan et al. ............. | 707/1 |
| 5,594,792 A | 1/1997 | Chouraki et al. ........... | 379/269 |
| 5,611,076 A | 3/1997 | Durflinger et al. .......... | 707/103 |
| 5,659,738 A | 8/1997 | Letkeman et al. .......... | 707/103 |
| 5,713,014 A | 1/1998 | Durflinger et al. .......... | 707/101 |
| 5,717,925 A | 2/1998 | Harper et al. ................ | 707/103 |
| 5,920,700 A | 7/1999 | Gordon et al. .............. | 709/226 |
| 5,966,707 A | 10/1999 | Van Huben et al. .......... | 707/10 |
| 5,974,407 A | 10/1999 | Sacks ............................ | 707/2 |
| 5,999,926 A * | 12/1999 | Suciu ............................ | 707/5 |
| 6,546,381 B1 * | 4/2003 | Subramanian et al. ......... | 707/2 |
| 6,567,802 B1 * | 5/2003 | Popa et al. ..................... | 707/3 |
| 2002/0120598 A1 * | 8/2002 | Shadmon et al. .............. | 707/1 |
| 2003/0065874 A1 * | 4/2003 | Marron et al. .............. | 711/100 |

OTHER PUBLICATIONS

Gang Gou; et al. discloses "An efficient and interactive A*–algorithm with pruning power: materialized view selection revisited"; Mar. 26–28, 2003, Database Systems for Advanced Applications, . Proceedings Eighth International, pp. 231–238.*

Wang Yuanzhen; Chen Yi; "Materialized Views For Layer-Relation Structured Database And Incremental Maintenance", Journal of Hauzhong (Central China), University of Science and Technology, vol. 27, No. 10.

J. Pittges, "Maintaining Instance–Based Constraints In The Metadata View Graph", Conference on Database Applications Semantics, Date: May 30–Jun. 2, 1995, Location: Atlanta GA.

Subbu B. Subramanian; Shivakumar Venkataraman; "Query Optimization Using Restructuring–Views", pp. 1–36.

* cited by examiner

*Primary Examiner*—Diane D. Mizrahi
(74) *Attorney, Agent, or Firm*—Kunzler & Associates

(57) ABSTRACT

A database maintenance system and method are particularly suitable for maintaining a consistency of data between two or more database tables having schemas that may be heterogeneous (e.g., restructuring views of each other). Typically, one table is a base table and a second table is a restructuring view of the base table and may have been generated for faster query response, research, or the like. The restructuring view may have occurred naturally, or the base table may have been converted to the restructuring view using a series of operators and optionally, a middleware schema. The restructuring view maintenance system is preferably configured to monitor changes to the base table, including changes to data and to metadata. The maintenance system is configured to receive notification of a modification to a base table, investigate the modifications, and determine which operator(s) have been used to convert the base table to the restructuring view. For each modification to the base table, the system then determines, according to the type of modification and the type of transformation used, which of a selected group of actions to take to map the modification onto the restructuring view. The selected group of actions may include variously: insert, update, delete, rename relation, drop table, and rename column, according to the type of modification and the mapping of the relationship between the base table and the target table.

30 Claims, 13 Drawing Sheets

(a) Fold Operation (b) Unfold Operation (c) Split Operation (d) Unite Operation db: :stock_trades

| date | stock | agent | xaction | value |
|------|-------|-------|---------|-------|
| 10/01 | ibm | ag007 | buy | 10000 |
| 10/01 | msft | ag007 | sell | 20000 |
| 10/02 | ibm | ag008 | buy | 22000 |
| 10/03 | ibm | ag009 | buy | 4000 |

426 canonical stock_trades
relation

Fig. 5a

RESTRUCTURING VIEW MAINTENANCE SYSTEM AND METHOD

BACKGROUND OF THE INVENTION

1. The Field of the Invention

The present invention relates to the maintenance of replicated data within databases. More specifically, the present invention relates to manners of maintaining data integrity within database tables having heterogeneous schemas.

2. The Relevant Technology

Information replication frequently occurs in modem database usage. An entity or organization may have access to various tables or "relations" within a one or more databases. The various tables may contain partially or fully replicated information. That is, the information or "data" within different tables may be equivalent. Additionally, the various tables may exhibit heterogeneous formatting, or "schemas." That is, the information within the various tables may be organized into different combinations of relations, rows, and columns, possibly with different relation names, row names, and columns. Such tables are referred to herein as being "restructuring views" of each other.

Tables containing replicated data may occur naturally. That is, the various tables exist for independent purposes. For instance, separate departments of an organization may individually maintain their own data or tables within a common database. However, the data that is populated within the various tables may originate from a common source. Separate databases that contain replicated information and heterogeneous schemas may also exist at different locations within a particular organization. Replicated information may also be generated and maintained by different organizations within separate databases that are commonly available over large scale networks such as the Internet.

In another scenario, data may also be replicated in multiple tables for research purposes. A first table or "base table" is generally a naturally occurring database. Other tables may be replicated as subsets of the first table. The replications often take the form of views. A view is a mechanism employed by database languages, such as SQL, that may act as a filter. A view may show only a portion of the data in the table to the user.

Views, as abbreviated forms of the tables, can be searched more quickly than the full table or set of tables. A view may be created every time it is referenced. A view may also be "materialized" and exist in a persistent form.

Generally, when data is replicated, such as for research purposes, integrity is maintained through the use of materialized views. A multiple database system (MDBS), in which materialized views are used for research and complex querying, is known as a data warehouse. Various tools for managing such data warehouses exist, one example of which is IBM's DataJoiner® product.

It may be a primary objective in designing database systems to expedite query servicing (i.e. reduce query latencies) by optimizing the query system. The use of materialized views is one manner in which the art has approached query optimization. It is often the case that certain materialized views can be more efficiently accessed for certain types of queries while others are more efficient for other types of queries. Thus, one technique for speeding up query servicing is to maintain a plurality of materialized views and to selectively direct queries to the appropriate materialized view for which the query can be most rapidly serviced.

A further development in the art of MDBS management is the addition of certain management tools to database languages such as SQL. One such tool is SchemaSQL. SchemaSQL is a proposed extension to the SQL language that promotes efficient manipulation and classification of materialized views. For instance, SchemaSQL provides "view definitions," which allow one materialized view to be mapped to another.

Conventional management and querying of views presumes that the views exhibit a common schema. Nevertheless, as discussed above, many naturally occurring multiple database systems include databases having heterogeneous schemas. Additionally, tables that are restructuring views of each other may, as discussed, be created for research purposes. Accordingly, many database systems include base tables and replicated tables that are restructuring views of those tables. While the prior art provides manners of maintaining standard materialized views, no provisions have been made for maintaining tables that are restructuring views of each other.

Accordingly, a need exists for a manner of maintaining database tables that are restructuring views of each other. Such a maintenance system, to be most advantageous, should be easily implemented with existing technology and noninvasive to the MDBS on which it is intended to operate. Such a maintenance system and its method of use are disclosed herein.

OBJECTS AND BRIEF SUMMARY OF THE INVENTION

The apparatus of the present invention has been developed in response to the present state of the art, and in particular, in response to the problems and needs in the art that have not yet been fully solved by currently available view maintenance systems. Thus, it is an overall objective of the present invention to provide a view maintenance system and method for a database management system that is capable of maintaining materialized views that are restructuring views of one or more base tables.

To achieve the foregoing object, and in accordance with the invention as embodied and broadly described herein in the preferred embodiment, a system for incremental maintenance of replicated information between a base table and a target table that are restructured representations of each other is provided. In the embodiments provided herein, the system includes: a monitoring module that receives notification of base table modifications; a consultation module that consults the base table about the nature of the base table modifications in response notification by the monitoring module; and a conversion module that receives the nature of the modifications from the consultation module and propagates the base table modifications into the target table, including propagating base table metadata changes into the target table.

In one embodiment, the base table and the target table are restructuring views of each other and are configured with heterogeneous schemas. Additionally, the system may include a mapping module configured to map the base table into the target table using various operators including without limitation fold operators, unfold operators, split operators, and unite operators.

The conversion module may also determine which mapping operators were used in mapping the base table to the target table and select a set of propagation operations to be used in propagating the base table modifications to the target table. For example, when the base table is mapped to the target table using a split operator, the set of propagation operations may include an insert operation, a create target table operation, a move row operation, an update operation, a delete operation, and a drop all target tables operation.

Another class of mapping operators supported in accordance with the invention are unite operators. In situations where restructuring views of the base table and the target table are related by a unite operator the conversion module may select a set of propagating operations such as an insert operation, an update operation, a delete operation, an update corresponding rows operation, and a delete corresponding rows operation.

Fold and unfold mapping operators are also supported in accordance with the invention. When the restructuring views of the base table and the target table are related by fold operators, the conversion module may select a set of propagating operations such as inserting, updating, and deleting a set of corresponding rows as well as inserting, updating, renaming, and deleting columns. One unfold mapping operator in accordance with the invention corresponds with a set of propagating operations that includes without limitation an insert column operation, an update row operation, an insert row operation, a set corresponding value to null operation, and a delete column operation.

An attendant method of for incremental maintenance of replicated information between a base table and a target table that are restructured representations of each other is also disclosed herein, and in certain embodiments comprises: receiving notification of modifications to the base table, including modifications to metadata of the base table; consulting the base table about the nature of the modifications to the base table in response to receipt of notification by the monitoring module; receiving the nature of the modifications; and propagating the modifications into the target table, including propagating changes to the metadata of the base table into the target table.

In one embodiment, the base table and the target table are restructuring views of each and have schemas that are heterogeneous.

The method may further comprise mapping the base table into the target table using an operator selected from the group consisting of a fold operator, an unfold operator, a split operator, and a unite operator.

The step of propagating the modifications into the target table may further comprise determining which of the operators were used in mapping the base table to the target table and selecting operations for propagating the modifications to the target table based upon the particular operator originally used.

The step of propagating the modifications into the target table may also comprise propagating the modifications to the target table according to the nature of the modifications to the base table, including selecting an operation from among a split operation, an insert operation, an update operation, and a delete operation.

The step of propagating the modifications into the target table further may also comprise selecting a propagation operation to propagate the modifications to the target table according to the nature of the modifications to the base table, the propagation operation selected from the group consisting of an insert operation, an update operation, a delete operation, a renaming relation operation; and a drop table operation.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5a illustrates a canonical database table.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 6d, is not intended to limit the scope of the invention, as claimed, but is merely representative of presently preferred embodiments of the invention.

FIGS. 1 through 6d are schematic block diagrams and flow chart diagrams which illustrate in more detail the preferred embodiments of the present invention. The schematic block diagrams illustrate certain embodiments of modules for performing various functions of the present invention. In general, the represented modules include therein executable and operational data for operation within a computer system of FIG. 1 in accordance with the present invention.

As used herein, the term module or subsystem are intended to include any type of computer instructions and computer executable code that may be located within a memory device and/or transmitted as electronic signals over a system bus or network. An identified module of executable code may, for instance, be organized as an object, procedure, or function. Nevertheless, the instructions of an identified module need not be located together, but may comprise disparate instructions stored in different locations which together comprise the module and achieve the purpose stated for the module. Indeed, a module could be a single software instruction, or many instructions, and may even be distributed over several different code segments, among different programs, and across several memory devices.

Similarly, operational data may be identified and illustrated herein within modules, and may be embodied in any suitable form and organized within any suitable type of data structure. The operational data may be collected as a single data set, or may be distributed over different locations including over different storage devices, and may at least partially exist merely as electronic signals on a system bus or network.

Figure 1:
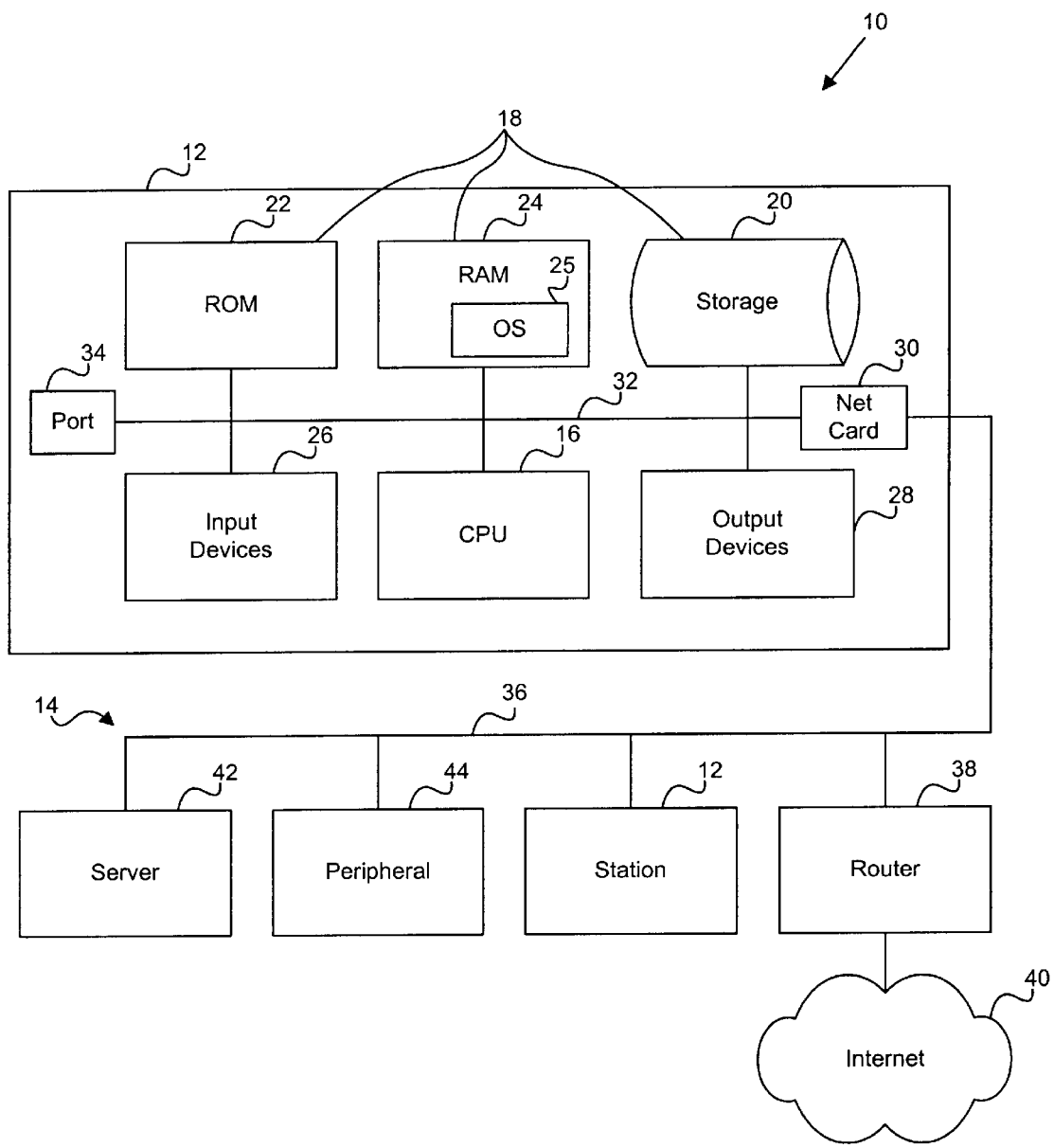
FIG. 1 is a schematic block diagram illustrating one embodiment of a computer system for use with the present invention.

FIG. 1 is a schematic block diagram that illustrates a computer system 10 in which executable and operational data, operating in accordance with the present invention, may be hosted on one or more computer stations 12 in a network 14. The network 14 may comprise a wide area network (WAN) and may also comprise an interconnected system of networks, one particular example of which is the Internet and the World Wide Web supported on the Internet.

A typical computer station 12 may include a processor or CPU 16. The CPU 16 may be operably connected to one or more memory devices 18. The memory devices 18 are depicted as including a non-volatile storage device 20 such as a hard disk drive or CD ROM drive, a read-only memory (ROM) 22, and a random access volatile memory (RAM) 24.

The computer station 12 or system 10 in general may also include one or more input devices 26 for receiving inputs form a user or form another device. Similarly, one or more output devices 28 may be provided within or be accessible from the computer system 10. A network port such as a network interface card 30 may be provided for connecting to outside devices through the network 14. In the case where the network 14 is remote from the computer station, the network interface card 30 may comprise a modem, and may connect to the network 14 through a local access line such as a telephone line.

Within any given station 12, a system bus 32 may operably interconnect the CPU 16, the memory devices 18, the input devices 26, the output devices 28 the network card 30, and one or more additional ports 34. The system bus 32 and a network backbone 36 may be thought of as data carriers. As such, the system bus 32 and the network backbone 36 may be embodied in numerous configurations. For instance, wire, fiber optic line, wireless electromagnetic communications by visible light, infrared, and radio frequencies may be implemented as appropriate.

In general, the network 14 may comprise a single local network (LAN), a wide area network (WAN), several adjoining networks, an intranet, or as in the manner depicted, a system of interconnected networks such as the Internet 40. The individual stations 12 communicate with each other over the backbone 36 and/or over the Internet 40 with varying degrees and types of communications capabilities and logic capability. The individual stations 12 may include a mainframe computer on which the modules of the present invention may be hosted.

Different communication protocols, e.g., ISO/OSI, IPX, TCP/IP, may be used on the network, but in the case of the Internet, a single, layered communications protocol (TCP/IP) generally enables communications between the differing networks 14 and stations 12. Thus, a communication link may exist, in general, between any of the stations 12.

The stations 12 connected on the network 14 may comprise application servers 42, and/or other resources or peripherals 44, such as printers and scanners. Other networks may be in communication with the network 14 through a router 38 and/or over the Internet 40.

The database maintenance system and method of the present invention may be implemented within a database management system. For the purposes of understanding the invention, a database management system capable of generating and querying tables that are restructuring views of each other will first be explained.

Figure 2:
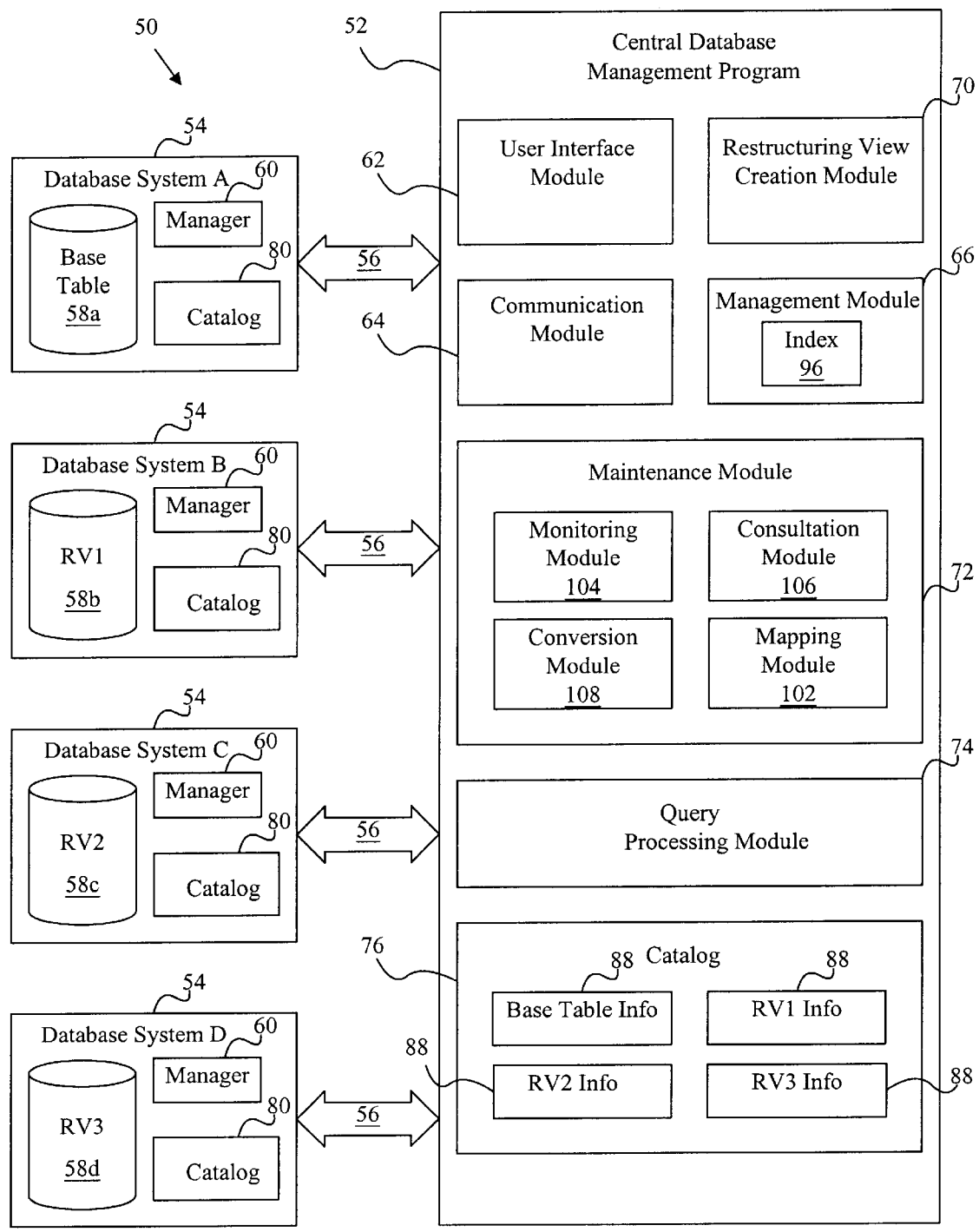
FIG. 2 is a schematic block diagram illustrating one embodiment of a database management program suitable for implementing the maintenance system and method of the present invention.

Referring now to FIG. 2, a multi-database system (MDBS) 50 that may be used in the implementation of the present invention in one embodiment includes a plurality of modules containing executable code and operational data suitable for execution by the CPU 16 and for operation within the memory devices 18 of FIG. 1. Of course, the memory devices 18 in which the modules of the present invention are located may also be distributed across both local and remote computer stations 12.

The MDBS 50 is shown in FIG. 2 comprising a central database management program (central program) 52 operating in conjunction with a plurality of database systems 54, each having one or more database tables 58. The database systems 54 may be local to the central program 52, existing on a common hard disk drive 20 within a common computer station 12. Alternatively, the database systems 54 may be remote to the central program 52, communicating across a remote link 56. The remote link 56 may comprise a network 14 (of FIG. 1) which may be a LAN or a WAN. The remote link 56 may also comprise a more global communication network, such as the Internet 40. While an example is given where the database tables 58 are within separate database systems 54, the tables 58 could be part of a common database program or system.

Each of the database systems 54 is preferably provided with a management module 60 that is configured for conducting such tasks as user interface, maintenance, query response, and the like. Within the database systems 54 may also be provided a catalog 80, as will be discussed below. Examples of database systems 54 with which the central program 52 may communicate include Sybase™, Informix™, Oracle™, and SQL Server™, SQL Anywhere™, Terradata™, and IBM's DB2™ in its various forms and configurations.

The central database management program 52 may be a single database management program such as IBM's DB2™, or may be a linking and communicating program that allows a user at a central location to communicate with a plurality of database systems, regardless of where the databases are located. Preferably, the central program 52 is also configured to allow a user to communicate with different types of database systems 54 in a federated environment, and to conduct operations upon the database systems 54. These operations may include, for example, generation or maintenance of tables within the database systems 54, maintenance, and communications such as querying the database systems 54. One example of a central database management program 52, given by way of example, is DataJoiner™, distributed by IBM Corporation of Rochester, N.Y.

The MDBS 50 as shown in FIG. 2 communicates with a plurality of database tables 58 that may be tables within one or more common databases, or may be within separate database systems 54 as depicted. The database tables 58 include a base table 58a, a first restructuring view table (RV2) 58b, a second restructuring view table (RV2) 58c, and a third restructuring view table (RV3) 58d. The restructuring view tables RV1, RV2, and RV3 are all restructuring views of the base table, containing identical data, but having heterogenous schema, as discussed above. The restructuring views RV1, RV2, and RV3 may be naturally occurring, or may have been created for improving query efficiency, research, data mining or the like. In one embodiment, the restructuring views RV1, RV2, and RV3 are generated by the restructuring view creation module 70 using schema mapping operators as will be discussed.

In the depicted embodiment, the central program 52 comprises an interface module 62 for allowing a human user to interact with the central program 52. Also shown is a communication module 64 for effecting communications with the database systems 54, a management module 66 for managing interactions between the different database systems 54, a restructuring view creation module 70 for creating restructuring views of a base table, and a maintenance module 72 for maintaining a consistency of contents of the database tables 58. Additionally, in the depicted embodiment, the management program 52 comprises a query processing module 74 for efficiently querying the various database tables 58 and a catalog 76 listing information regarding the various database tables 58.

The query processing module 74 may be configured to receive a query from a user through the user interface module 62 and to transmit the query to the relevant database systems 54 to answer the query. In a further embodiment, the query processing module 74 is also configured to optimize the query into an optimized query plan that accesses the requested data efficiently. One example of a manner of configuring a query processing module is described in our copending patent application Ser. No. 09/412,034 filed on Oct. 4, 1999 for Query Optimization System and Method, which is hereby incorporated by reference into this document.

The catalog 76 in one embodiment contains information 88 regarding each of the communicating database systems 54. For instance, a mapping of each database table 58 may be stored within the catalog 76. Other information regarding the schema, contents, database system type, and the like may also be stored within the catalog 76.

Figure 2A:
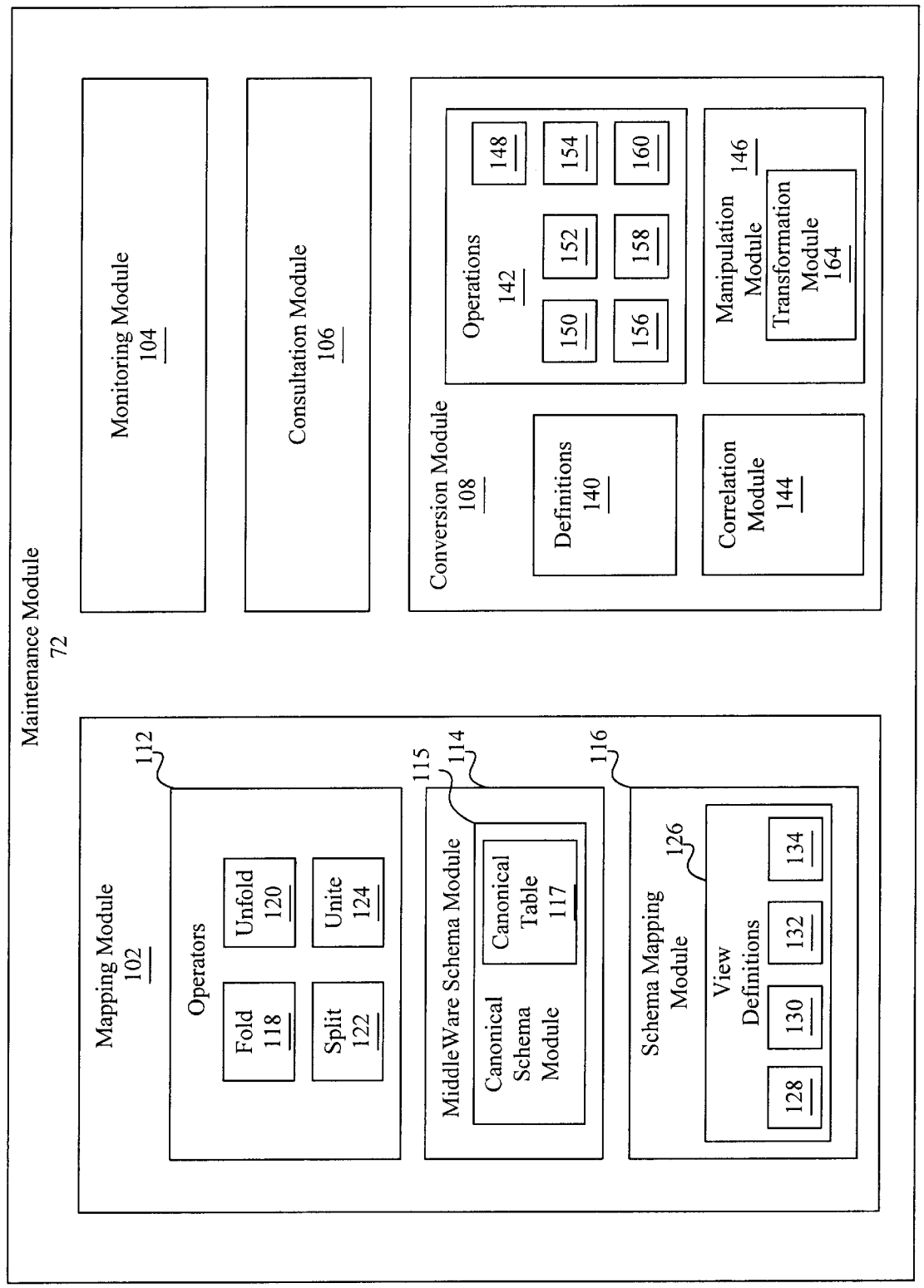
FIG. 2a is a schematic block diagram illustrating a maintenance module of the present invention.

The maintenance module 72 is preferably configured with a monitoring module 104, a consultation module 106, a conversion module 108, and a mapping module 102. The operation of the maintenance module 72 will be discussed in greater detail with reference to FIG. 2a. As shown in FIG. 2a, one embodiment of a mapping module 102 comprises a plurality of restructuring operators 112, a middleware schema 114, and a schema mapping module 116.

In one embodiment of the present invention, the mapping module 102 is used to express a schema mapping of the database tables 58. The schema mapping may be in the form of view definitions 126 which, in one embodiment, comprise view definitions under the proposed addition to the SQL language entitled SchemaSQL, which is discussed below.

Figure 4:
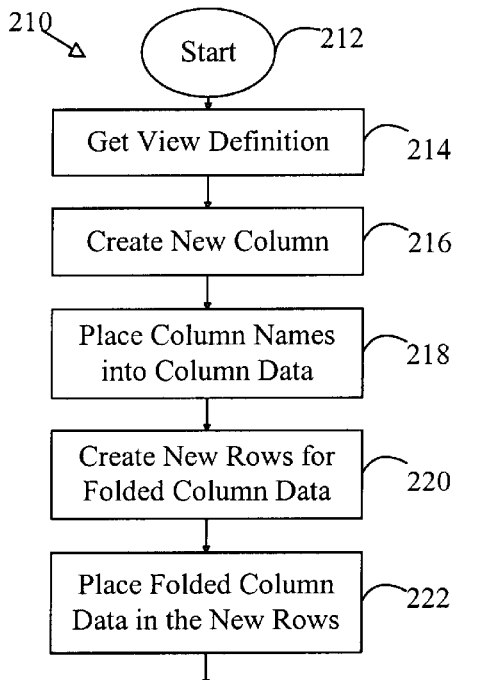
FIG. 4 depicts four schematic flow chart diagrams, illustrating respectively a fold operation, an unfold operation, a split operation, and a unite operation.
Figure 4:
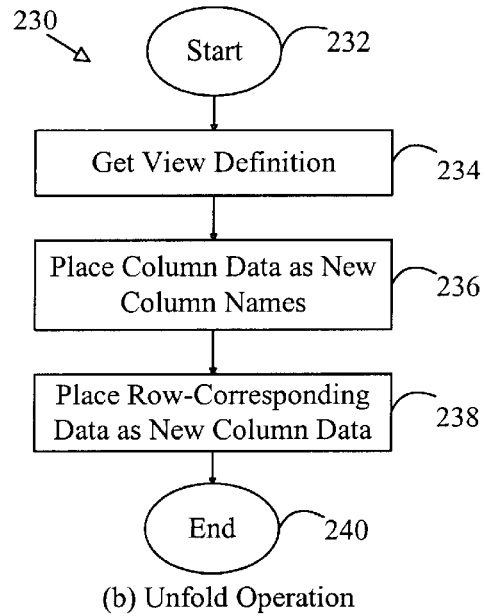
Figure 4:
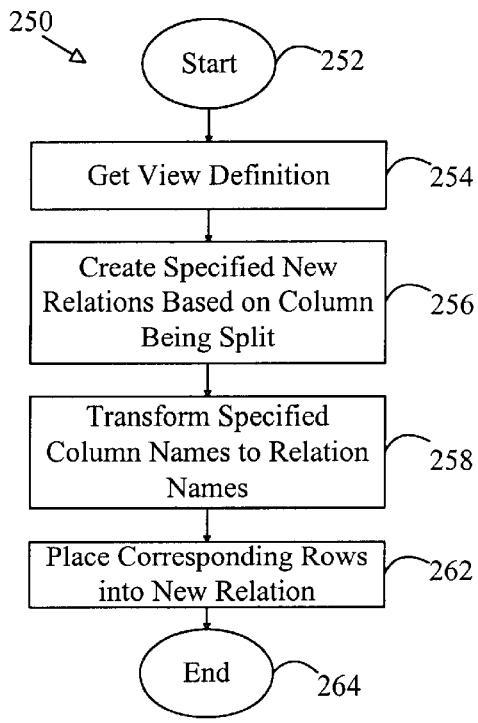
Figure 4:
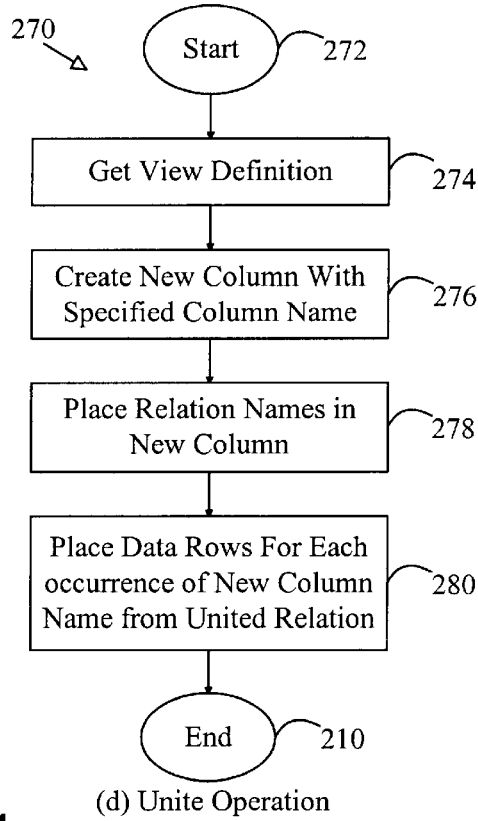

The schema mapping may be used in order to generate the restructuring views 58b, 58c, 58d by restructuring the base table 58a. The schema mapping may also be achieved with the use of the operators 112 which represent and implement the various operations involved in restructuring a base table to a restructuring view and vice verse. In one embodiment, the view definitions 126 employ the operators 112 to express the schema mapping of the database tables 58. One example of the employment of the operators 112 is shown in FIG. 4 and is discussed below in greater detail.

In one embodiment, the schema mapping achieved by the mapping module 102 employs a middleware schema 114 that functions as a central point in the conversions between a base table and a restructuring view. In the depicted embodiment, the middleware schema 114 comprises a canonical schema 115 which may be used to map the base table to a canonical table 117.

The canonical table 117 is devised of data which is partially or fully equivalent to the data of the database tables 58 of the MDBS 50. Additionally, the canonical table 117 has a schema which is either equivalent to or a restructuring view of each database 58 of the MDBS 50. Preferably, the canonical schema module 115 devises and references the canonical table 117, but does not materialize the canonical table 117. The canonical table 117 and the canonical schema in general are discussed below in greater detail.

DATABASE EXAMPLES

Figure 3:
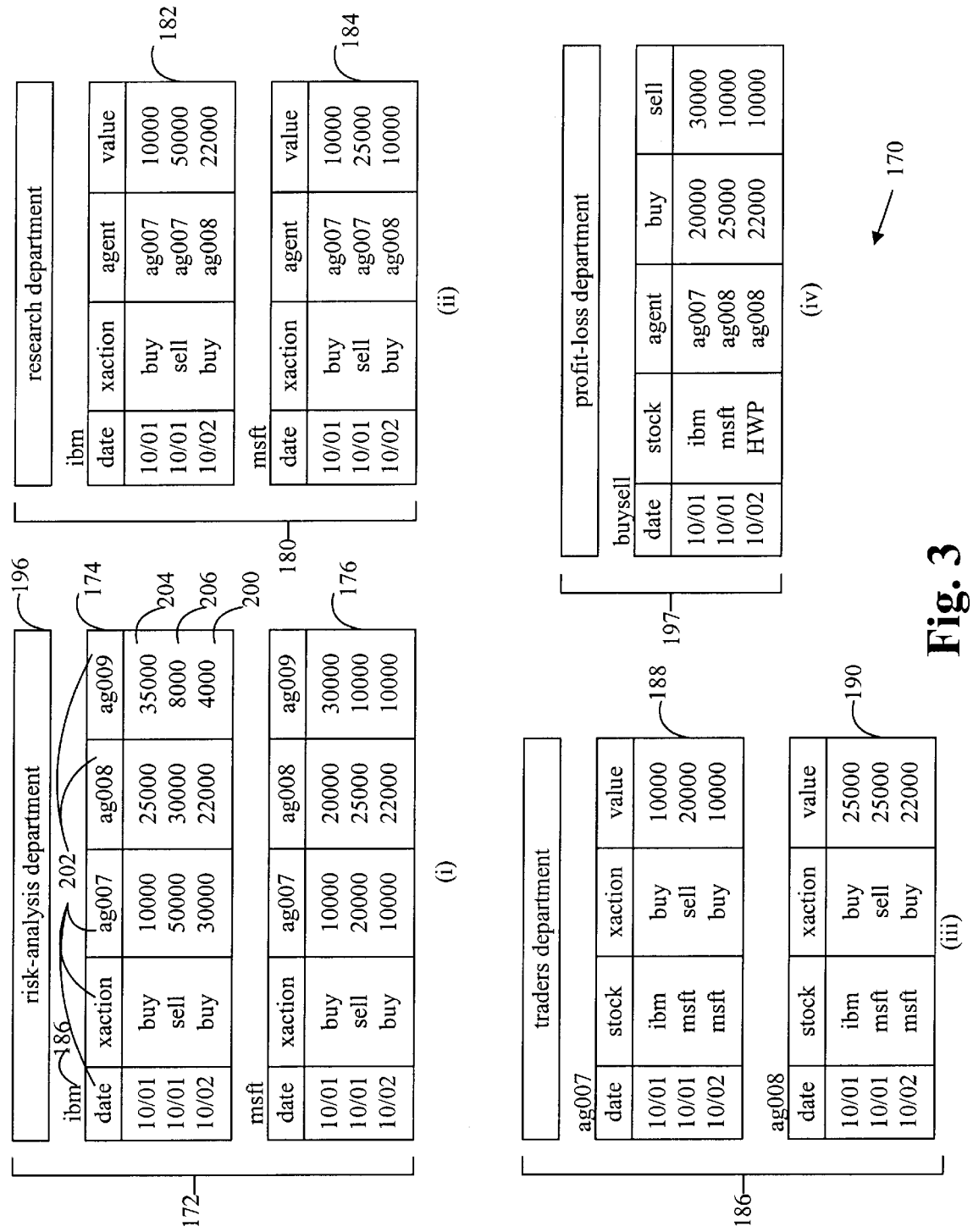
FIG. 3 illustrates four database tables that are restructuring views of each other.

FIG. 3 shows a MDBS 170 containing four representative database tables 170 which will be used throughout this discussion as examples. The database tables 170 may or may not correspond to the database tables 58 of FIG. 2. Of course, only a portion of the database tables 170 are represented, in order to show the particular schemas of the databases. The database tables 170 are restructuring views of each other, and as such, any of the database tables 170 can be treated as the base table or the restructuring views. In the given example, all of the database tables 170 are naturally occurring within a stock brokerage and are generated from a feeder database and a common set of data. Accordingly, the database tables 170 contain identical data, but express the data with heterogeneous schemas which are restructuring views of each other.

A risk-analysis department database 172 is shown configured with an ibm relation 174 and a msft relation 184. A research department database 180 is shown with an ibm relation and a msft relation. A traders department database 186 is shown with an ag007 relation 188 and an ag008 relation 190. A profit-loss department database 192 is shown with a single relation, a buysell relation 194.

Each of the database tables 170 of FIG. 3 comprises a table name 196, one or more relations 198, relation names 199, columns 200, column names or attributes 202, rows 204, and column data 206.

SchemaSQL

As the MDBS 50 of FIG. 2 may employ the proposed SchemaSQL extension of the SQL language, it is helpful to discuss the semantics and syntax of the SchemaSQL language in greater detail. A more elaborate treatment of the language including its formal semantics and giving numerous illustrative examples is found in Subbu I. N. Subramanian, A Foundation for Integrating Heterogeneous Data Sources. PhD thesis, Department of Computer Science, Concordia University, Montreal, Canada 1997. The discussion herein references Table 1, which lists queries directed to the various representative database tables 170 of FIG. 3.

TABLE 1

```
select distinct A
from risk-analysis -> S, risk-analysis::S -> A
where A < > "date" and A < > "xaction"
(Q1)
select distinct T.agent
from research -> S, research::S T
(Q2)
select distinct A
from traders -> A
(Q3)
select distinct T.agent
from profit-loss::buysell T
(Q4)
```

SchemaSQL Query: "List names of all agents" on the various databases: Q1 on risk-analysis; Q2 on research; Q3 on traders; and Q4 on profit loss.

SQL queries allow variable declaration over the tuples in a relation. In contrast, SchemaSQL permits the declaration of variables that can range over (1) names of the relations in a database, (2) names of the attributes in a relation, and (3) values appearing in a column corresponding to a given attribute in a relation, in addition to tuple variables allowed in SQL. Variable declarations in SchemaSQL follows the same syntax as <range> <var> in SQL, where <var> is any identifier.

Table 1 shows the query "List names of all agents" expressed as SchemaSQL queries on the brokerage databases of FIG. 3. The simplest of them all is the query Q4 on the profit-loss database. In query Q4, T is a tuple variable that ranges over the buysell relation. The SchemaSQL syntax requires specifying the database name of the relation. Apart from this minor variation, query Q4 is also a SQL query.

Query Q3 on the traders database, on the other hand, is a SchemaSQL query that makes use of a relation name variable to list the names of all the agents. Note that the agent names appear as relation names in the traders database. In query Q3, the declaration traders-> A declares A as a variable that ranges over the relation names. In the research database, the agent names appear under the agent column across all the stock relations.

Query Q2 captures this by declaring a relation variable, and A as an attribute name variable that ranges over the attribute names of the stock relations (risk-analysis::S->A) with the provision that it does not range over the column names that are not agent names (captured by the where clause).

Besides querying, SchemaSQL also has the ability to define restructuring views of the data in databases that catapult data values to schema name positions and vice verse. For example, the brokerage firm databases of FIG. 1 can all be represented as SchemaSQL views of one another. In the following section of the restructuring operators are introduced and defined using generic SchemaSQL view definitions.

Restructuring Operators

FIG. 4 contains schematic flow charts (a) through (d) illustrating embodiments of the basic operation of the operators 112 of FIG. 2. Flowchart (a) illustrates a fold operation 210. Flowchart (b) illustrates an unfold operation 230. Flowchart (c) illustrates a split operation 250, and flowchart (d) illustrates an unfold operation 270.

The fold operator 74 can be characterized as folding column names into column data. The column names in the input relation on which the fold operator acts appear as column values in the output relation. For example, the SchemaSQL view definition V2 of table 2 below captures the ibm relation of the research database as a view of the ibm relation of the risk-analysis database. The fold operator 74 in one embodiment accomplishes a fold operation 210 of FIG. 4.

Referring to FIG. 4, the fold operation 210 will be discussed in terms of an input table and a transformed output table. The fold operation 210 starts at step 212 and progresses to a step 214 in which the processor 16 receives a SchemaSQL or other suitable view definition 82 embodying instructions for implementing the fold operation. At a step 216, in accordance with the view definition 82, a new relation is created based upon the input table and is provided with an additional column obtained from the create view clause.

At a step 218, column names from the input table are placed in the new column as column data. At a step 220, new rows are created to contain the data within previously within the columns which are being folded. At a step 222, the folded column data is placed in the new rows. At a step 224, the operation ends.

The risk-analysis department table 172 and research department table 180 of FIG. 3 illustrate one example of the fold operation 210. Applying the fold operation 210 to the risk-analysis department table 172 results in the reformation to the research department table 180. Specified column names 202 of the risk-analysis department table 172 are folded into column data 206 in the research department table 180.

The fold operation 210 can also be expressed in a particular example as a generic a SchemaSQL definition in which, C1, C2, etc., denote distinct individual column names, <C> denotes a set of column names, and X, Y, T, A, etc. denote distinct variables. The view definition is as follows:

create view db::rel' (C1, C2, <C>) as
select X, Y, T. <C>
from db::rel T, db::rel-> X, T.X Y
where preserveConditions (X)

In this definition, C1, C2 are not equivalent to <C>. We call C1 the foldOn column and C2 the foldBy column. The set of columns <C> is called the PRESERVE-d columns. The preserveConditions (X) statement ensures that the PRESERVE-d columns indeed get preserved in the output schema.

The unfold operator 78 is the inverse of the fold operator 74. The unfold operator 78 transports the column values in the input relation into column name positions in the output relation in an information preserving manner. For example, the relation ibm of the risk-analysis database in FIG. 3(i) is an unfold-ed representation of the relation ibm of the research database, FIG. 3(ii). This is because agents appear as column values in the latter database, and appear as column names in the former. The unfold operator 78 may be characterized by the unfold operation 230 of FIG. 4.

The unfold operation 230 starts at a step 232 and progresses to a step 234 where the processor 16 receives a SchemaSQL or other suitable view definition embodying instructions for implementing the unfold operation. In accordance with the view definition, at a step 236, column data from a specified column of the input relation are transformed into column names and placed in the output relation. At a step 238, data from rows in which each data transformed to attributes appeared is placed in rows with data from a specified column of the input relation appearing as column data for the new columns of the output relation. The unfold operation ends at a step 240.

The risk-analysis department table 172 and research department table 180 of FIG. 3 also illustrate an example of the unfold operation 230. Applying the unfold operation 230 to the research department table 180 results in a reformation to the risk-analysis department table 172. The unfold operation 230 results in specified column values in the input relation, the research department table 180 being transported into column name positions in the output relation, the risk-analysis department table 172.

The unfold operation 230 can also be expressed in a particular example as a generic SchemaSQL definition in which, C1, C2, etc., denote distinct individual column names, <C> denotes a set of column names, and X, Y, T, A, etc. denote distinct variables. The view definition is as follows:

create view db::rel' (X, <C>) as
select Y,T. <C>
from db::rel T, T.C1 X, T.C2 Y

In this relation, C1, C2 are note equivalent to <C>. We call C1 the unfoldOn column and C2 the unfoldby column. The set of columns represented by <C> are the preserve-d columns. In the example V1 in Table 2 below, the unfoldOn column is agent and the unfoldBy column is value. Date and xaction are the preserve-d columns.

The split operator restructures a specified relation into a set of relations whose names are obtained from specified column values in the original relation. For example, the agent007 and agent 008 relations 188, 190 of the traders database in FIG. 3(iii) is a split rendering of the stock_trades relation of FIG. 9. One embodiment of the manner of operation of the split operator 76 is illustrated by the split operation 250 FIG. 4.

The split operation 250 starts at a step 252 and progresses to a step 254 in which the processor 16 receives a SchemaSQL or other suitable view definition embodying instructions for implementing the split operation. In accordance with the view definition, at a step 256, the new relations that are to be created are specified in the view definition, which may be entered as a parameter by a user. At a step 258, specified column names are transformed to relation names. At a step 262, rows corresponding to the input relation column data placed as column names in the output relation are placed into the output relation. The split operation 250 ends at a step 264.

The traders department table 186 and profit-loss department table 192 of FIG. 3 also illustrate an example of the split operation 250. Applying the split operation 250 to the profit-loss department table 192 results in a reformation to the traders department table 186. The split operation 250 results in a restructuring of the buysell relation 194 into a set of relations ag007 (188), and ag008 (190) whose names are obtained from column values 206 in the original relation, buysell 194.

The split operation 250 can also be expressed in a particular example as a generic SchemaSQL definition in which, C1, C2 etc., denote distinct individual column names, <C> denotes a set of column names, and X, Y, T, A, etc. denote distinct variables. The view definition is as follows:

create view db::X (!C?) As
select R. !C?
From db::rel R, R. C1 X

In this relation, we call C1 the splitOn column. All the relations in db not affected by the split operator are called the preserve-d relations. In the example view definition V3 in Table 2 below, agent is the splitOn column. Assuming that there are no other relations in db, the set of preserve-d relations is the empty set. A unique characteristic of the split operator, compared to the other restructuring operators and the classical relational algebra operators is that, it takes a single relation as input and generates a set of relations as output. The split operator is the only operator in the present invention that produces a set of relations as output. Due to the nature of the split operator, a restructuring-view in general can be a set of relations in a database.

The unite operator 80 is the inverse of split operator 76. The unite operator has the effect of combining several relations conforming to the same schema into a single relation, so that the relation names of the input relations appear in the data position in the transformed schema. For example, the stock_trades relation of FIG. 9 is a result of the unite operator applied on the agent relations of the traders database in FIG. 3(iii). The unite operator 80 in one embodiment performs the unite operation 270 of FIG. 4.

The unite operation 270 starts at a step 272. At a step 274, the processor 16 receives a SchemaSQL or other suitable view definition embodying instructions for implementing the split operation. In accordance with the view definition, at a step 276, an output relation is created with a new column with a column name specified by the user, possibly through a parameter call or in response to a prompt.

At a step 278, specified relation names from the input relation are placed in the output relation in the new column. At a step 280, data rows for each occurrence of the new column name from the input relation are placed in the output relation. The unfold operation 270 ends at a step 282.

The traders department table 186 and profit-loss department table 192 of FIG. 3 also illustrate an example of the unite operation 270. Applying the unite operation 270 to the traders department table 186 results in a reformation to the profit-loss department table 192. The unite operation 270 results in a combining of specified relations, ag007 (188) and ag008 (190) into a single relation, buysell 194, so that the relation names ag007, ag008 appear in the data position 206 in the transformed profit-loss department table 192.

The unite operation 270 can also be expressed in a particular example as a generic SchemaSQL definition in which, C1, C2, etc. denote distinct individual column names, <C> denotes a set of column names, and X, Y, T, A, etc. denote distinct variables. The view definition is as follows:

create view db::rel' (C1, <C>)
select X, T.<C>
from db-> X, X T
where preserveConditions (X)

In this view definition, we call C1 the uniteon column. We call the complement of the set of relations in the database on which unite acts as the preserve-d relations. The preserveConditions (X) conditions ensure that the PRESERVE-d relations indeed get preserved in the output database. In example V4 of Table 2 below, the uniteon column is agent. All relations of the traders database participate in the unite operator. So the set of PRESERVE-d relations is the empty set.

TABLE 2

```
create view
risk-analysis::ibm (date, xaction, A) as
select I.date, I.xation, V
from research::ibm I, I.agent A, I.value V
(V1)
create view
research::ibm (date, xaction, agent, value) as
from risk-analysis::ibm I,
risk-analysis::ibm->A, I.A V
where A! ='date' and A!= 'xaction'
(V2)
create view
traders::A(date, stock, xaction, value) as
select R.date, R.stock, R.xaction, R.value
from db::stock_trades R, R.agent A
(V3)
create view
db::stock_trades (date, stock, agent, xaction, value) as
select T.date, T.stock, A, T.xaction,
T.value
from traders -> A, A T
(V4)
```

Examples Illustrating the Restructuring Operations

Table 3 is a listing of the restructuring transformation among the database tables 58 of FIG. 3. The preserve information for Split and Unite is the empty set in this example.

TABLE 3

| Source (db/rel) | Restructuring Expression | Destination |
| --- | --- | --- |
| research::ibm | unfold on agent by value preserve date, xaction | risk-analysis::ibm |
| risk-analysis::ibm | fold on agent by value preserve date, xaction | research::ibm |
| profit-loss::buysell | fold on xaction by value preserve date, stock, agent; split on agent | traders |
| traders | unite on agent; unfold on xaction by value preserve date, stock, agent | profit-loss::buysell |
| research | unite on stock; split on agent | traders |

MDBS Architecture

Figure 5:
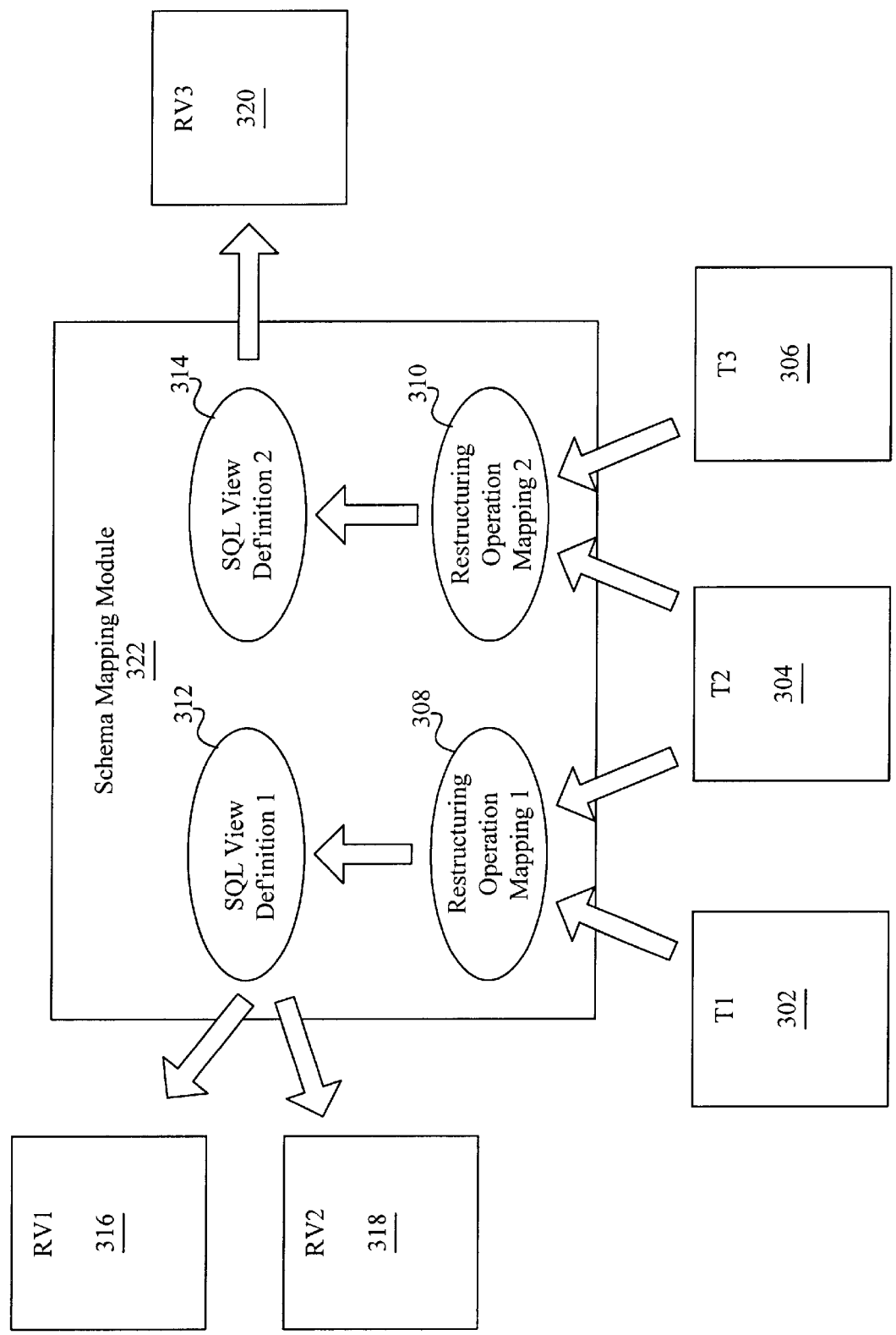
FIG. 5 is a schematic block diagram illustrating one embodiment of a MDBS system and a schema mapping of the MDBS system.

FIG. 5 represents one embodiment of a MDBS data management architecture 300 suitable for use with the query optimization system 50 of FIG. 1. Also shown in FIG. 5 is a schema mapping module 322 for mapping restructuring views 316, 318, 320 from one or more base tables 302, 304, 306. Whereas the restructuring views 170 of FIG. 3 are naturally occurring, FIG. 5 illustrates an arrangement that may occur within data warehouses. The restructuring view creation module 70 of FIG. 2 may, in one embodiment, employ the schema mapping module 322 in generating database tables that are restructuring views of a base table.

As discussed, the MDBS 50 may be implemented using IBM's DataJoiner™ product. DataJoiner is a heterogeneous database system that provides a single database image of multiple databases and provides transparent access to tables at remote databases through user defined aliases that can be accessed as local tables. DataJoiner is also a fully functional relational database system. Queries submitted to the MDBS are optimized using a cost based optimizer that has knowledge of the remote optimizer capabilities to generate an optimal global plan.

In FIG. 5, the schema mapping module 322 is used to transform the base tables 302, 304, 306 into restructuring views 316, 318, 320. In so doing, a mapping 308, 310 is first generated capable of transforming the base tables into the canonical schema. From the canonical schema 312, 314, the base tables 302, 304, 306 are transformed into restructuring views 316, 318, 320. The system is preferably managed by a system such as DataJoiner™ which implements the query optimization system 50 of FIG. 2 to promote rapid querying and analysis of data within the base tables 302, 304, 306.

Canonical Schema

The restructuring operators of the previous section, by blurring the distinction between data and meta-data, provide a framework where seamless mapping and querying of both data and schema is possible. From a practical perspective, the need for querying schema components arises because the tokens that the application treats as data appears as a schema component in the database. The notion of canonical schema introduced in this section is based on the observation that if all the objects of query-able interest are modeled as data, the application can express its queries in any first-order query language (such as SQL) and would not need the capability for metadata querying. Thus, canonical schema is a central component in one embodiment of a query processing architecture suitable for use with the present invention.

The canonical schema of the present invention is the same as the first-order schema presented in Miller R. J., Using Schematically Heterogeneous Structures, published in: In Proceedings of the ACM SIGMOD Conference, pages 189–200, Seattle, Wash., May 1998. We first define the canonical schema and then present a result that brings out the power of the restructuring operators.

Definition of Canonical Schema

Given a set of queries Q, a relational schema S is called a canonical schema relative to Q if all queries Q can be expressed as first-order queries on S. For example, the schema of the relation Stock_trades of FIG. 9 is a canonical schema relative to the queries we have considered so far in this paper because all objects of query-able interest, namely date, stock, agent, xaction, and value, are modeled as data. We now present the following theorem that establishes the power of the restructuring algebra.

Let V be a restructuring-view, Q be a set of queries on V, and S be a canonical schema relative to Q. There exist expressions $\tau, \tau'$ consisting only of the restructuring operators such that for every instance $V_I$ on V, (1) $\tau(V\ I)=S_I$ is an instance of S, (2) $\tau'(S_I)=V_I$ and (3) $S_I$ satisfies the following property:

∀ Q ∈ Q, there exists a first-order query Q' on S such that
 $Q(V_I)\equiv Q'(S_I)$ Proof Sketch: There are two parts of this proof. The first part proves that the transformation has the ability to restructure a schema to a canonical schema and back. The proof is based on the observation that the operators retain the canonical schema information every step of the way. The second part proves that the transformation is performed in an information preserving manner. The proof for the this draws on the semantics of SchemaSQL. The details are presented in Miller.

FIG. 5a shows one embodiment of a canonical table 426 presented as a representative example of the canonical table 92 of FIG. 2. The canonical table 426 is entitled stock_trades. The stock_trades canonical table 426 of FIG. 5a is generated based upon the restructuring views tables 170 of FIG. 3.

Figure 6:
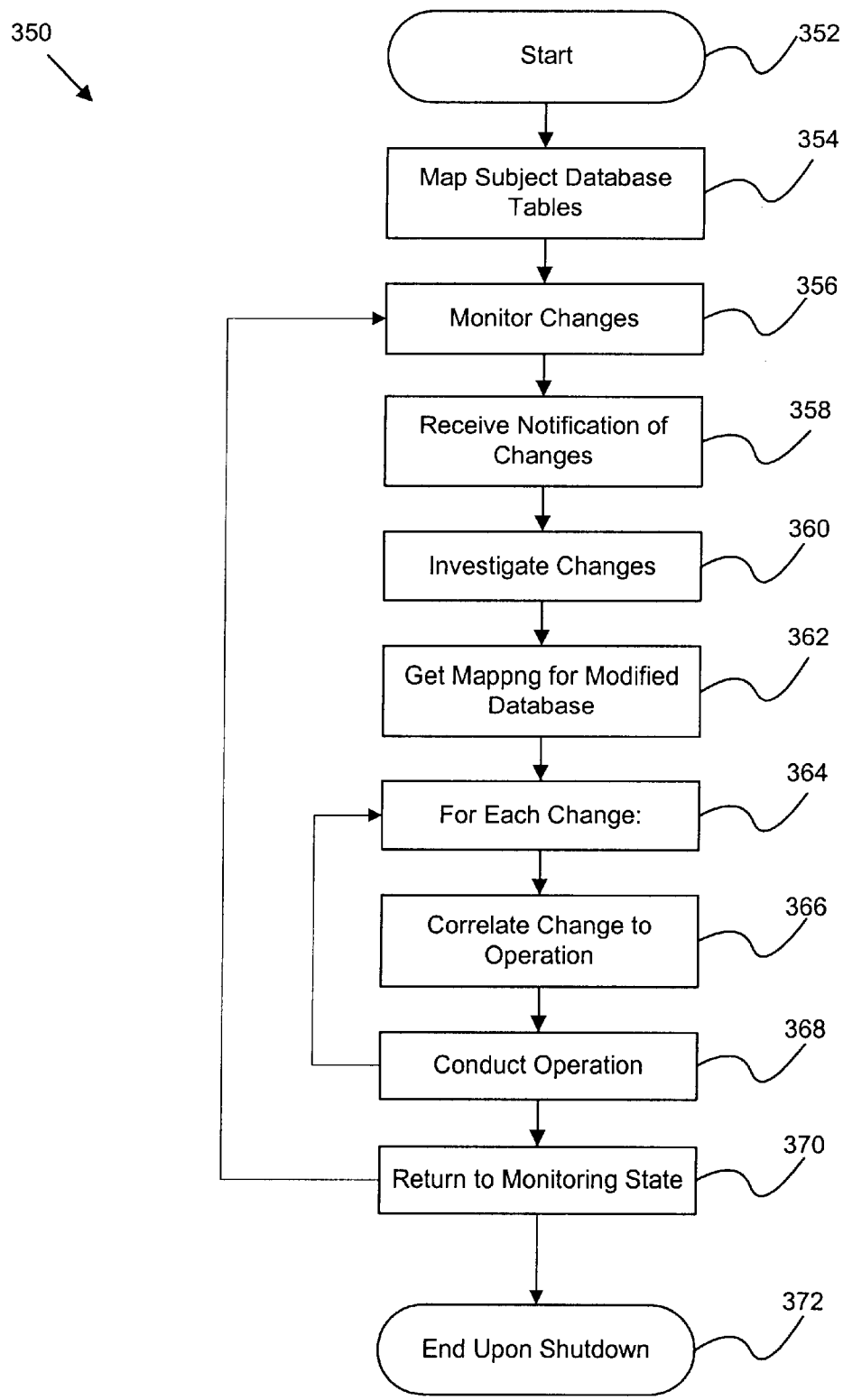
FIG. 6 is a schematic flow chart diagram illustrating a maintenance method of the present invention.
Figure 7:
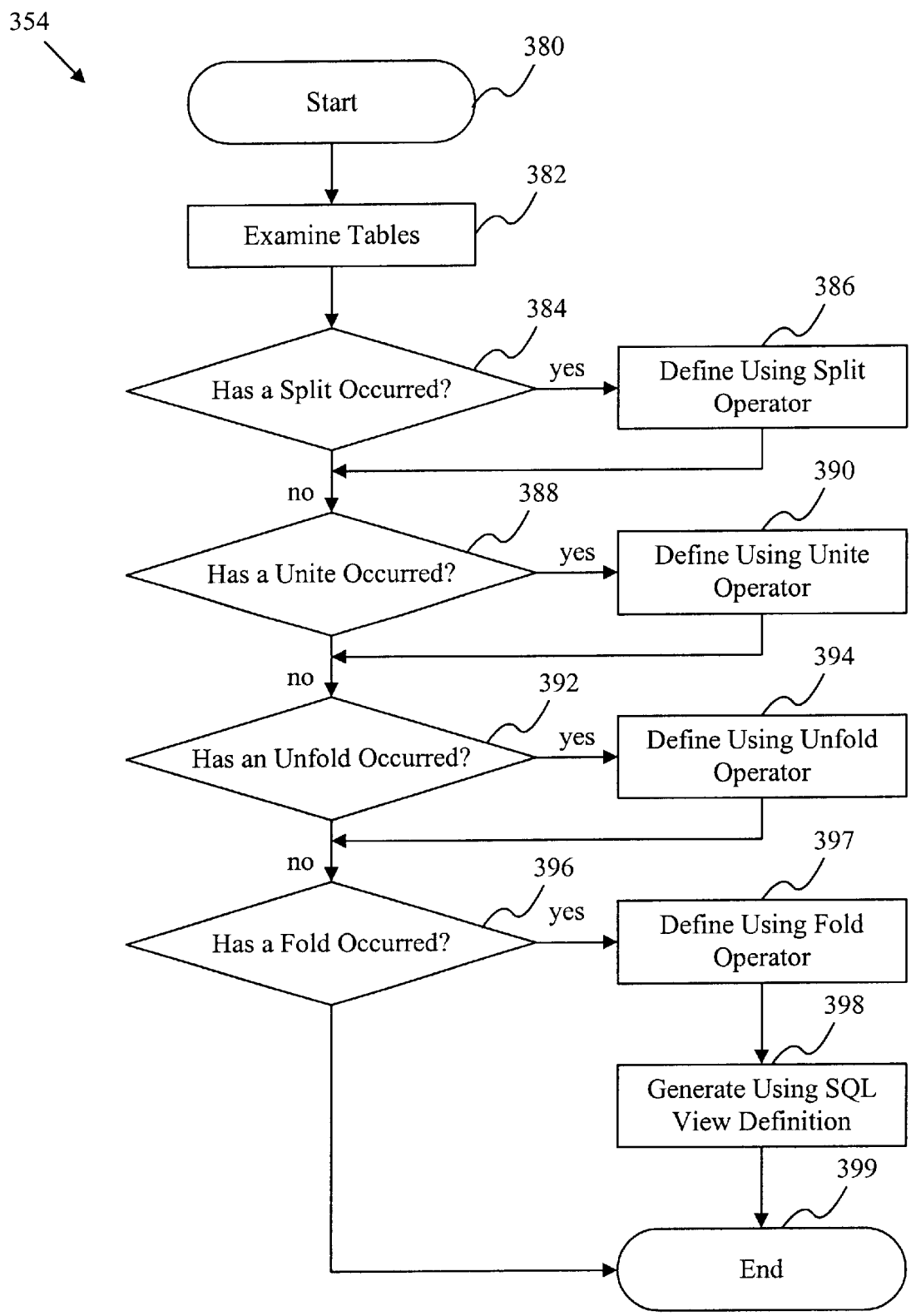
FIG. 7 is a schematic flow chart diagram illustrating one embodiment of a mapping operation of the present invention.

Referring now to FIG. 6, one method of maintaining a MDBS having one or more database tables that are restructuring views of each other will now be described. The method 350 begins at a start step 352 and progresses to a step 354 in which the subject database tables are mapped. One embodiment wherein the MDBS comprises the MDBS 50 of FIG. 2 will be given herein as an example. In accordance with this embodiment, the restructuring view database tables 58b, 58c, and 58c are mapped to the base table 58a. This may be conducted manually, but is in one embodiment conducted automatically by a mapping module such as the mapping module 102 of FIGS. 2 and 2a. FIG. 6a describes one manner of automatically mapping a restructuring view to a base table.

Referring momentarily to FIG. 6a, the mapping step 354 may be conducted as a method starting at a start step 380. At a step 382, the restructuring view table and the base table are examined to determine the differences in the schemas thereof. Once the differences are obtained, those differences are characterized. In so doing, the method 354 initially checks, as indicated by a step 384, whether the differences indicate that a split has occurred. This inquiry may take the form of checking whether data in one column of one table has been transformed to a relation name in the restructuring view table. For example, the traders department table 186 is a split representation of the profit-loss department table 192. If a split has occurred, the mapping is defined using the split operator at a step 386.

At a step 388, the method 354 checks to see if a unite has occurred. This inquiry may take the form of checking whether relation names in the base table have been transformed to column data in the target database. For example, the profit-loss department table 192 is a split representation of the traders department table 186. If a unite has occurred, the mapping is defined using a unite operator at a step 390.

At a step 392, the method 354 checks to see if a fold has occurred. This inquiry may take the form of checking whether column names in the base database have been moved to column data in the target database. For instance, the research department table 180 is a folded representation of the risk-analysis department table 172. If a fold has occurred, the mapping is defined using a fold operator at a step 394.

At a step 396, the method 354 checks to see if an unfold has occurred. This may take the form of checking whether column data in the base table have been moved to column names in the target table. For instance, the risk-analysis department table 172 is an unfolded representation of the research department table 180. If an unfold has occurred, the mapping is defined using an unfold operator at a step 397.

At a step 398, a SQL view definition is generated using the operators as determined in the above steps. The SQL view definitions are preferably similar to those discussed above, and maybe combinations of definitions where more than a single operator is used to describe a single mapping. The method 354 ends at a step 399, and is preferably conducted for each restructuring view in the MDBS. The mapping is preferably stored within the MDBS, and in one embodiment, within the information 88 of the catalog 76 of the central database management program 52 of FIG. 2.

Returning to FIG. 6, once the restructuring view tables are mapped to the base table at the step 354, the method 350 progresses to a step 356 where changes to the base table are continually monitored. This is conducted in one embodiment with a monitoring module such as the monitoring module 104 of FIG. 2. The monitoring may be conducted using triggers programmed into the base table as is known in the art. The triggers inform the monitoring module every time there has been a change to data in the base table, and in a preferred embodiment, also every time there has been a change to metadata of the base table.

Of course, where the restructuring views or multiple base tables are separate databases subject to change independent of the others, and it is wished to maintain a consistency of data within the tables, each table may be monitored by a program such as the central database management program 52 and the changes noted and propagated into all of the corresponding tables as will be discussed.

At a step 358, notification of a change is received by the monitoring module. At a step 360, the change is investigated to determine the exact nature of the change. In one embodiment, this is conducted using a consultation module such as the consultation module 106 of FIGS. 2 and 2a. The consultation module preferably consults a log within the base table 38 (the table in which the change occurs, though of course, any of the tables 38 could be the subject of the change) which lists modifications to the base table 58. In one embodiment, the log is contained within a catalog 80 of the base table.

At a step 362, the mapping between the restructuring view 58a, 58b, 58c being updated and the base table 58a is fetched. This may comprise retrieving the mapping from the information 88 stored within the catalog for the restructuring view. Once again, any of the restructuring view tables may comprise a base table in an embodiments such as that of FIG. 3 where each table is a restructuring view of the others, and changes to any of the tables could be made to the rest of the changes using the method of the present invention.

Figure 8A:
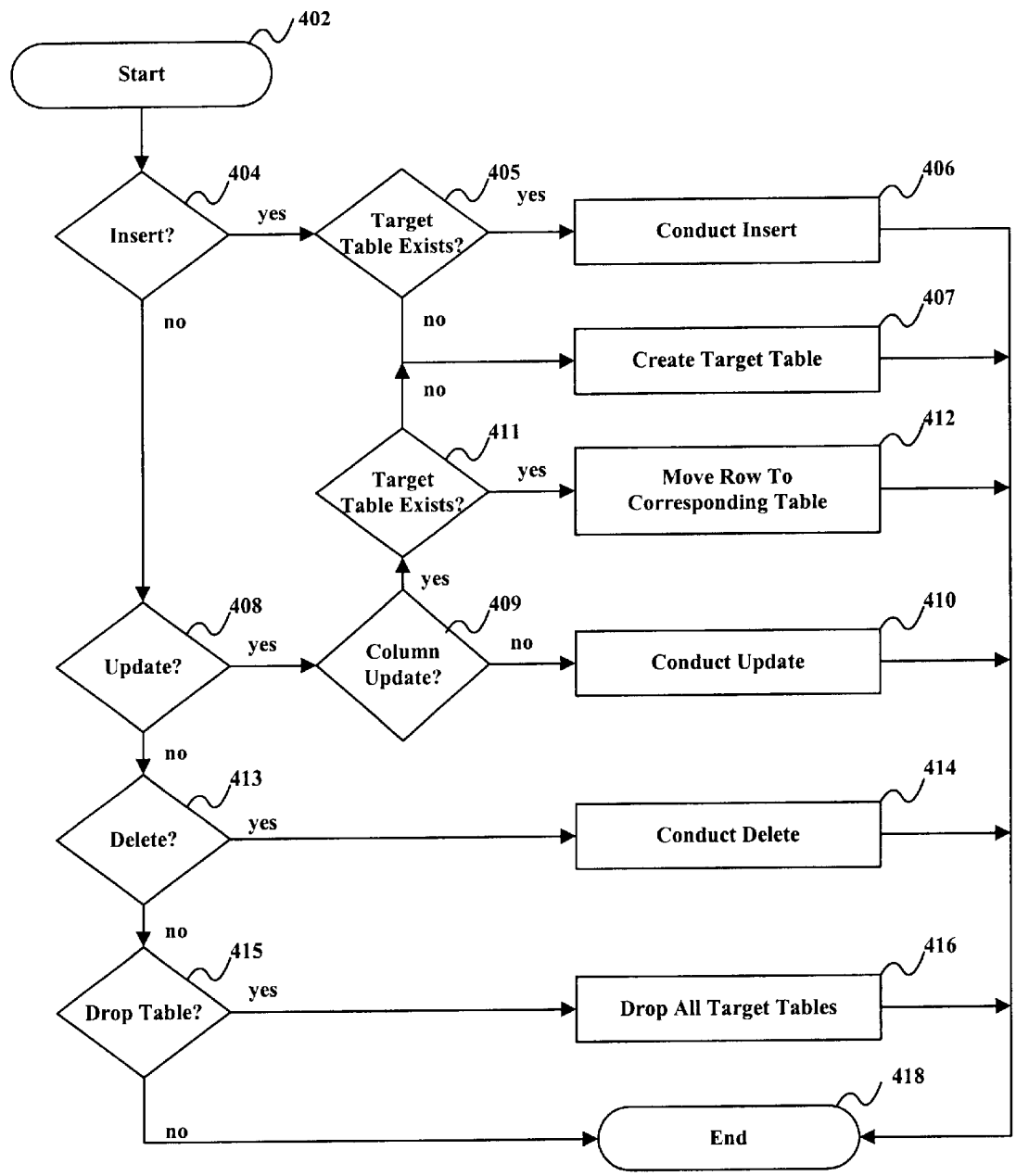
FIGS. 8a through 8d are schematic flow chart diagrams illustrating manners of converting changes on a base table to tables that are restructuring views of the base table.
Figure 8B:
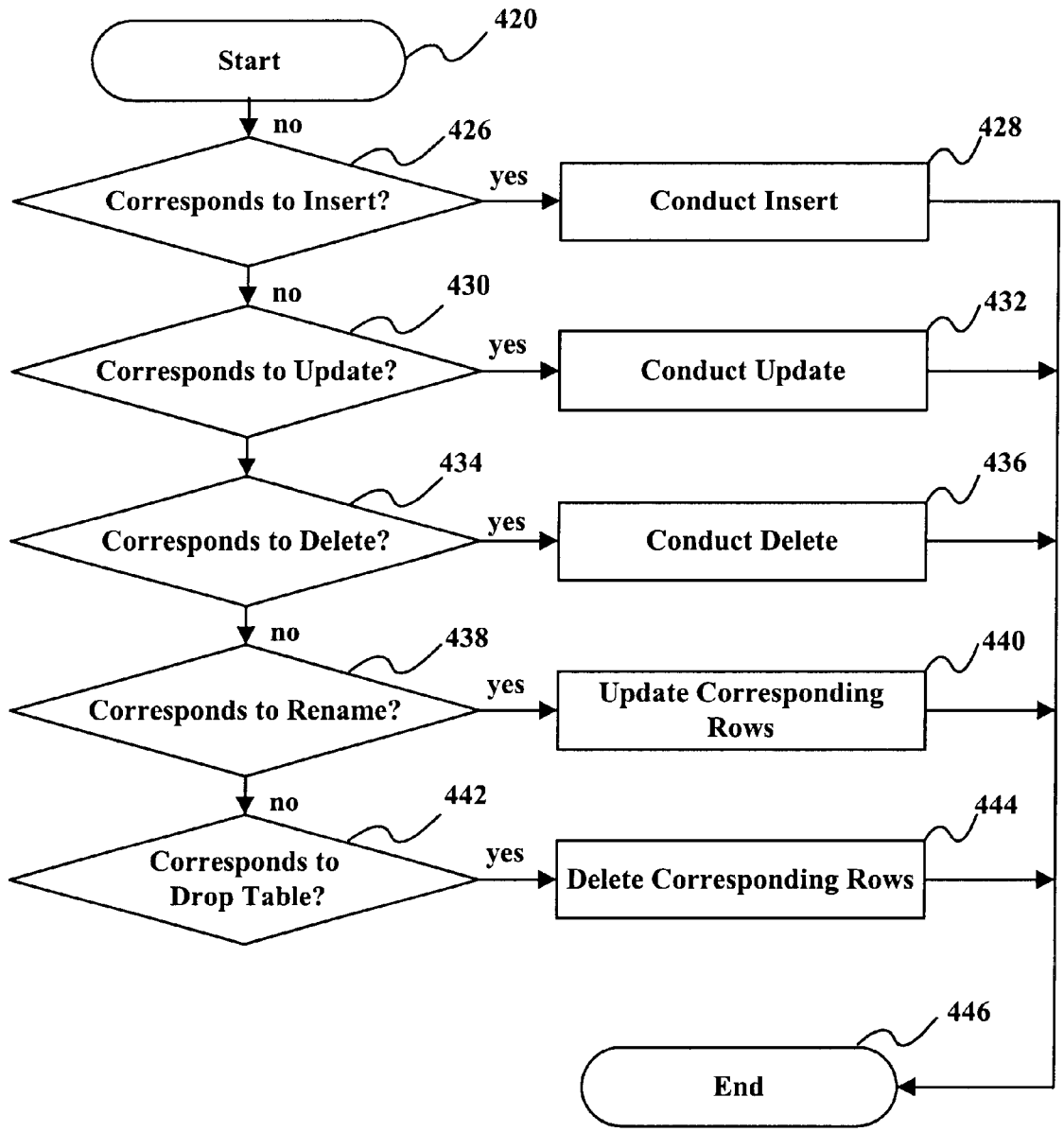
Figure 8C:
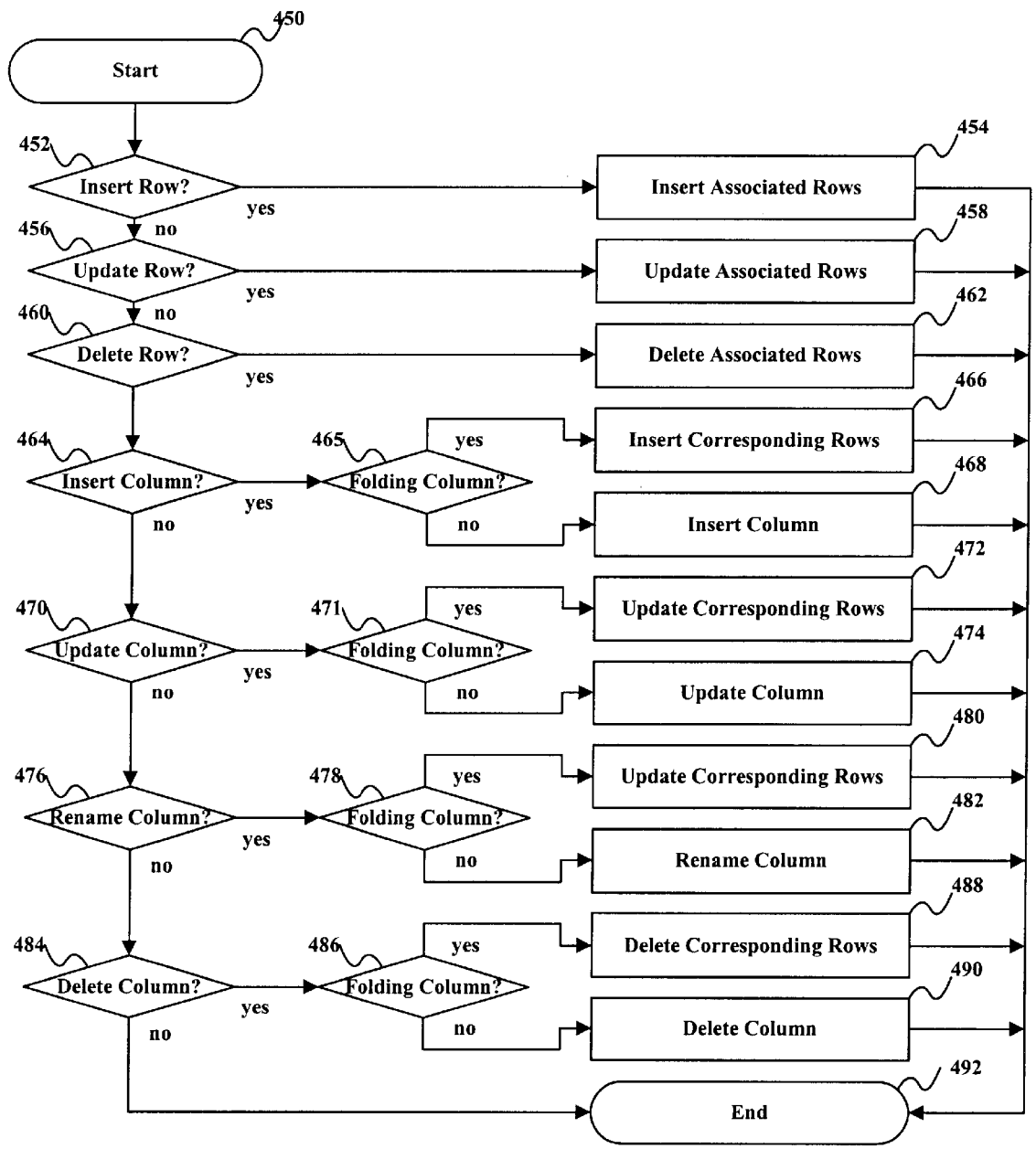
Figure 8D:
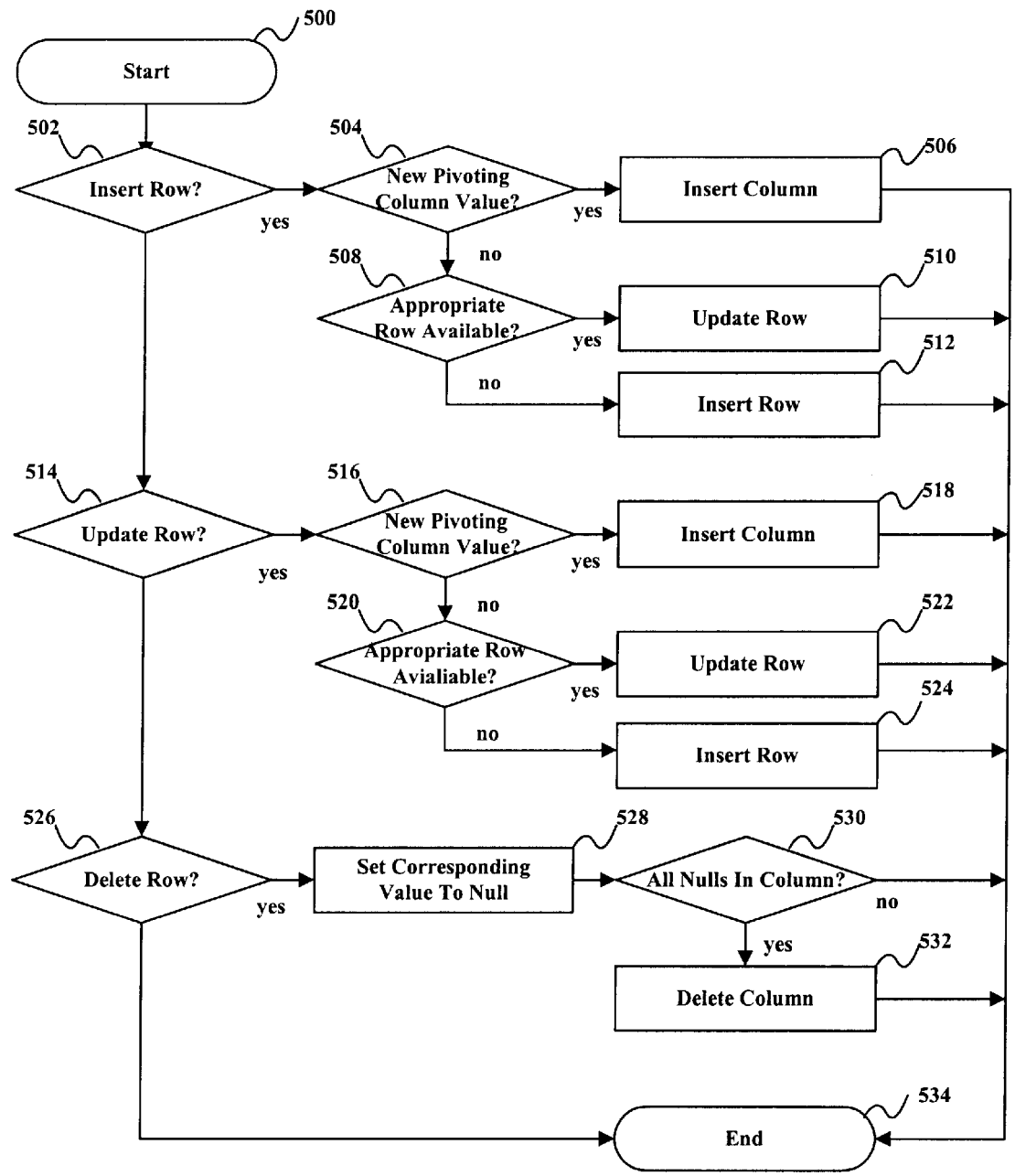

As indicated at a step 364, for each change noted within the log and located at the step 360, steps 366 and 368 are conducted. At the step 366, the particular change is correlated with a management operation. At a step 368, that management operation is conducted. The determination within Step 366 depends upon the mapping conducted above and is illustrated by FIGS. 8a through 8d according to the particular mapping of the restructuring view table being updated and the base table upon which each change has occurred. For instance if the mapping retrieved at the step 362 indicates a split operation between the base table and the target table (the restructuring view of the base table), the method of FIG. 8a is conducted. If the mapping indicates a unite operation, the method of FIG. 8b is conducted. If the mapping indicates a fold operation, the method of FIG. 8c is conducted. Finally, if the mapping indicates an unfold operation, the method of FIG. 8d is conducted.

Referring now to FIGS. 8a through 8d, each of the determinations and their corresponding operations will now be described. Beginning with FIG. 8a, if the mapping includes a split operation, a correlation module such as the correlation module 144 begins a correlation operation at a step 402 and proceeds to a step 404. At the step 404, the correlation module checks whether the changes require an insert operation. If an insert operation is required, the correlation operation proceeds to a step 405.

At a step 405, the correlation module determines which target table corresponds to the tuple. For instance, for each tuple added to the source relation that is split, the split column value is preferably converted to a relation name. If a target table with the desired relation name exists, the insert is conducted at a step 406. If there is no such target table, a table is created with the split column value as the relation name at a step 407.

Otherwise, the correlation method proceeds to a step 408, where the correlation module checks whether the changes require an update operation. At a step 409, the correlation module checks whether the required update involves a splitting column. If the splitting column value is not updated, a tuple update is conducted at a step 410. Step 410 updates the target table corresponding to the split column value.

If step 409 determines that the required update involves a splitting column, the correlation module proceeds to a step 411. At the step 411, as in step 405, the correlation module checks whether a target table with the desired relation name exists. If not, a target table is created at the step 407 and the tuple is moved to the newly created table. Otherwise, the correlation module proceeds to a step 412.

At step 412, the correlation module moves the associated tuple from a target table corresponding to the old split column value, to a target table corresponding to the new split column value. Thus, if the split column is updated in the source relation, the tuple is moved from the table that corresponds to the old split column value to the target table that corresponds to the updated split column value. The source table is preferably deleted at this time if it is empty. If required, source table deletion may be conducted at either step 407 or step 412. U Referring back to step 408, if the changes do not require an update operation, the correlation module proceeds to a step 413. At step 413, the correlation module checks whether the changes require a delete operation. If so, at step 414, the tuple is deleted from the target table associated with the split column value. If the deleted tuple is the last tuple in the target table, the target table is preferably deleted.

If step 413 determines that no delete operation is required, the correlation module proceeds to a step 415. At step 415, the correlation module checks whether a drop table operation is required. If so, all target tables are dropped at a step 416 before proceeding to a step 418. If step 415 determines that no drop table operation is required, the correlation module also proceeds to step 418. The method ends at step 418.

Referring to FIG. 8b, if the mapping indicates a unite operation, the correlation module begins the method at the step 420. At the step 422, the changes are examined to determine if an insert operation is required. This comprises checking whether a tuple has been added to any of the source tables. If so, a corresponding tuple is added to the target table at a step 428, and the relation name of the source table is transformed into a column value.

Otherwise, the method proceeds to a step 430 where the correlation module checks whether the changes require an update operation. An update is conducted whenever an update occurs in any of the source tables. A source table update is translated into an update of the corresponding tuple in the target table at a step 432. The tuple in the target table is identified by the column values of the row that is updated.

Otherwise, the method proceeds to a step 434 where the correlation module checks whether the changes require a delete operation. A delete is conducted when an entry in the source column is deleted and comprises a deletion of the corresponding entry in the target column. This is conducted at a step 436.

Otherwise, the method proceeds to a step 438 where the correlation module checks whether the changes correspond to a rename column operation. If a rename column operation is required, the method proceeds to a step 440. Step 440 translates the column rename into an update of the target table tuples in the rows associated with the particular source table.

Thus, a rename column operation is conducted when a column is renamed in one of the source tables. The renamed column may involve multiple rows, in instances, for example when the particular source table has multiple rows. Each row associated with a source table has a folded column value corresponding to the source table relation.

If no rename column operation is required, the method proceeds from step 438 to a step 442 whereupon the correlation module checks whether the changes correspond to a drop table operation. When one of the source tables is dropped, multiple deletes are conducted on the target table at a step 444. Step 444 deletes the rows associated with the particular source table. Each row associated with the dropped table will have a folded column value corresponding to the relation (name) of the dropped table. The method proceeds from step 444 and other steps to end at a step 446.

Referring to FIG. 8c, if the mapping indicates a fold operation, the correlation module begins the method beginning at a step 450. At a step 452, the changes to the source table are examined to determine if they correlate with an inserted row. If so, the method proceeds to step 454. Step 454 inserts one row per source table folding column into the target table. Since the tuples associated with the folding columns fold into a single column in the target, inserting one row for each folding column maintains an association between source table tuples and target table tuples.

If the correlation module determines at step 452, that no row has been inserted into the source table, step 456 checks whether a row has been updated. If so, the method proceeds to step 458. Step 458 updates the corresponding rows in the target table (one row per folding column), otherwise the method proceeds to step 460. Step 460 checks if the changes correspond to a delete row operation. If so, step 462 deletes the rows containing target table tuples that correspond to the tuples deleted in the source table row. If the changes do not correspond to a delete row operation the method proceeds from step 460 to step 464.

At step 464, the changes are examined to determine whether a column has been inserted into the source table. If a column has been inserted, the method advances to a step 465 to determine if the inserted column is a folding column. If a folding column was inserted, the method proceeds to a step 466 to insert a set of corresponding rows in the target table. The inserted rows contain tuples corresponding to the tuples in the inserted source table column. If step 465 determines the inserted column was not a folding column, the method instead proceeds to step 468. Step 468 inserts a column into the target table corresponding to a non-folding source table column.

If the correlation module determines at step 464, that the changes do not correspond to a column insert operation, the correlation module proceeds to step 470 to check if the changes correspond to a column update operation. If so, the method proceeds to step 471 to determine the nature of the update. If the update is associated with a folding column, the method proceeds to step 472. Step 472 updates the target table tuples corresponding to the updated source table column. If the updated source table column is not a folding column, the method proceeds from step 471 to step 474. Step 474 updates the target table column corresponding to a non-folding source table column.

If the result of the inquiry of step 470 is no, the method proceeds to a step 476 where the correlation module checks whether the changes correspond to a column rename operation. If so, the method proceeds to a step 478 to determine if the updated source table column is a folding column. If the updated column is a folding column the method proceeds to a step 480, otherwise to a step 482.

Similar to step 472, step 480 updates the target table tuples corresponding to a source table column. Renaming of a column maps to target table updates in that the folding operation transforms column names into folded column values. Since the renaming is column based, the number of corresponding tuples or rows affected by the rename corresponds to the number of rows in the source table. Step 482, however, simply renames the target table column since the renamed source table column is determined to be a non-folding column.

The method proceeds from step 476 to step 484 if the changes do not correspond to a column rename operation. At step 486, the correlation module checks whether the changes correspond to a delete column operation. If the changes do correspond, the method proceeds to a step 486, otherwise to a step 492. At step 486, the correlation module determines whether the column delete involves a folding column. If a folding column is involved, the method proceeds to a step 488, otherwise the method proceeds to a step 490.

Since a folding column is involved, step 488 deletes the rows in the target table containing tuples that correspond to tuples in a source table column that is a folding column. Step 490 however, deletes a column in the target table rather than rows (as in step 488) since a non-folding column is involved. After executing step 488 or step 490, the method ends at a step 492. The correlation module may also proceed to step 492 from certain other steps as depicted in FIG. 8c.

Referring to FIG. 8d, if the mapping indicates an unfold operation, the correlation module begins the method beginning at a step 500. At a step 502, the changes are examined to determine whether a row insert operation is necessary. If necessary, the method proceeds to a step 504.

At step 504, the correlation module checks if the value in the unfolding or pivoting column is a new value i.e. if there is no column name in the target table corresponding to the pivoting column value of the inserted row. The pivoting or unfolding column is the column from which the unfolded column names (in the target table) are derived. If the pivoting column value is new, the method proceeds to a step 506 and inserts a new column in the target table with a column name that corresponds to the pivoting column value of the inserted row.

If the result of the inquiry of step 504 is no, the method proceeds to a step 508, where the correlation module checks to see if an appropriate target table row is available to store the tuples associated with the inserted row. Checking for an available appropriate row may comprise searching for a row with a null value in the column with a name corresponding to the pivoting column value in the inserted row. If an appropriate row is available, the method proceeds to a step 510 and updates the row. Otherwise, the method proceeds to a step 512 and inserts a row into the target table.

The method proceeds from step 502 to a step 514 if the changes do not correspond to a row insert operation. At step 514, the correlation module checks whether the changes correspond to a row update operation. If the changes correspond, the method proceeds to a step 516. Step 51 is similar to step 54 in that the correlation module-checks if the pivoting column value (in the inserted row) is a new value. If the value is new, the method proceeds to a step 518 and inserts a new column into the target table. The name of the new column corresponds to the new pivoting column value.

If, at step 516, the pivoting column value is not new, the method proceeds to a step 520. At step 520, similar to step 508, the correlation module checks if an appropriate row is available in the target table. If an appropriate row is available, the method proceeds to a step 522, otherwise to a step 524. Step 522 updates the appropriate row while step 524 inserts a new row into the target table.

The correlation module proceeds from step 514 to step 526 if the changes do not correspond to a row update operation. At step 526, the correlation module determines if the changes correspond to a delete row operation. If the changes do correspond, the method proceeds to a step 528. Since the source table deleted row corresponds to a specific tuple in the target table, step 528 places a null value in the target table.

After placing a null value in the target table, the method may, in one embodiment, check whether the column in which the null value was placed contains all null values. If so, the method executes step 532 and deletes the column in which the null value was placed. In either case, the method proceeds to a step 534 whereupon the method ends.

Returning back to FIG. 6, once the operation is conducted at the step 368 as determined by the methods of FIGS. 8a through 8d, the next change is fetched at the step 364 until all changes have been propagated to the restructuring view (target table). The process then loops back to the step 356, where the monitoring module continues to monitor the base table(s) for new changes. The method ends upon shutdown of the MDBS at a step 372.

What is claimed is:

1. A system for incremental maintenance of replicated information between a base table and a target table that are restructured representations of each other, the system comprising:
   a monitoring module configured to receive notification of modifications to the base table;
   a consultation module configured to consult the base table about the nature of the modifications to the base table in response to receipt of notification by the monitoring module; and
   a conversion module configured to receive the nature of the modifications from the consultation module and propagate the modifications into the target table, including propagating changes to the metadata of the base table into the target table.

2. The system of claim 1, wherein the base table and the target table are restructuring views of each other having heterogeneous schemas.

3. The system of claim 1, further comprising a mapping module configured to map the base table into the target table using an operator selected from the group consisting of a fold operator, an unfold operator, a split operator, and a unite operator.

4. The system of claim 3, wherein the conversion module is configured to determine which operators were used in mapping the base table to the target table and deriving the operations of propagating the modifications to the target table based upon the particular operator originally used.

5. The system of claim 3, wherein the conversion module is configured, when the base table is mapped to the target table using a split operator, to select a propagation operation to propagate the modifications to the target table according to the nature of the modifications to the base table, the propagation operation selected from the group consisting of a split operation, an insert operation, an update operation, and a delete operation.

6. The system of claim 3, wherein the conversion module is configured, when the base table is mapped to the target table using a split operator, to select a propagation operation to propagate the modifications to the target table according to the nature of the modifications to the base table, the propagation operation selected from the group consisting of an insert operation, an update operation, a delete operation, a renaming relation operation; and a drop table operation.

7. The system of claim 3, wherein the conversion module is configured, when the base table is mapped to the target table using a split operator, to select a propagation operation to propagate the modifications to the target table according to the nature of the modifications to the base table, the propagation operation selected from the group consisting of an insert operation, an update operation, and a delete operation.

8. The system of claim 3, wherein the conversion module is configured, when the base table is mapped to the target table using a split operator, to select a propagation operation to propagate the modifications to the target table according to the nature of the modifications to the base table, the propagation operation selected from the group consisting of an insert operation, an update operation, a delete operation; and a column renaming operation.

9. The system of claim 3, wherein the mapping module is configured to map the base table into the target table using Schema SQL view definitions.

10. The system of claim 1, wherein the monitoring module, the consultation module, and the conversion module are substantially located within a common database management program and at least one of the base table and the target table are remote to the database management program.

11. A method for incremental maintenance of replicated information between a base table and a target table that are restructured representations of each other, the method comprising:
receiving notification of modifications to the base table, including modifications to metadata of the base table;
consulting the base table about the nature of the modifications to the base table in response to receipt of notification by the monitoring module;
receiving the nature of the modifications; and
propagating the modifications into the target table, including propagating changes to the metadata of the base table into the target table.

12. The method of claim 11, wherein the base table and the target table are restructuring views of each other having heterogeneous schemas.

13. The method of claim 11, further comprising mapping the base table into the target table using an operator selected from the group consisting of a fold operator, an unfold operator, a split operator, and a unite operator.

14. The method of claim 13, wherein propagating the modifications into the target table further comprises determining which of the operators were used in mapping the base table to the target table and selecting operations for propagating the modifications to the target table based upon the particular operator originally used.

15. The method of claim 13, wherein propagating the modifications into the target table further comprises propagating the modifications to the target table according to the nature of the modifications to the base table, including selecting an operation from among a split operation, an insert operation, an update operation, and a delete operation.

16. The method of claim 13, wherein propagating the modifications into the target table further comprises selecting a propagation operation to propagate the modifications to the target table according to the nature of the modifications to the base table, the propagation operation selected from the group consisting of an insert operation, an update operation, a delete operation, a renaming relation operation; and a drop table operation.

17. The method of claim 13, wherein propagating the modifications into the target table further comprises, when the base table is mapped to the target table using a split operator, selecting a propagation operation to propagate the modifications to the target table according to the nature of the modifications to the base table, the propagation operation selected from the group consisting of an insert operation, an update operation, and a delete operation.

18. The method of claim 13, wherein propagating the modifications into the target table further comprises, when the base table is mapped to the target table using a split operator, to select a propagation operation to propagate the modifications to the target table according to the nature of the modifications to the base table, the propagation operation selected from the group consisting of an insert operation, an update operation, a delete operation; and a column renaming operation.

19. The method of claim 13, wherein mapping the base table into the target table comprises mapping the base table into the target table using Schema SQL view definitions.

20. The system of claim 11, wherein at least one of the base table and the target table are remote to the database management program.

21. An article of manufacture comprising a program storage medium readable by a processor and embodying one or more instructions executable by the processor to perform a method for incremental maintenance of replicated information between a base table and a target table that are restructured representations of each other, the method comprising:
receiving notification of modifications to the base table, including modifications to metadata of the base table;
consulting the base table about the nature of the modifications to the base table in response to receipt of notification by the monitoring module;
receiving the nature of the modifications; and
propagating the modifications into the target table, including propagating changes to the metadata of the base table into the target table.

22. The article of manufacture of claim 21, wherein the base table and the target table are restructuring views of each other having heterogeneous schemas.

23. The article of manufacture of claim 21, further comprising mapping the base table into the target table using an operator selected from the group consisting of a fold operator, an unfold operator, a split operator, and a unite operator.

24. The article of manufacture of claim 23, wherein propagating the modifications into the target table further comprises determining which of the operators were used in mapping the base table to the target table and selecting operations for propagating the modifications to the target table based upon the particular operator originally used.

25. The article of manufacture of claim 23, wherein propagating the modifications into the target table further comprises propagating the modifications to the target table according to the nature of the modifications to the base table, including selecting an operation from among a split operation, an insert operation, an update operation, and a delete operation.

26. The article of manufacture of claim 23, wherein propagating the modifications into the target table further comprises selecting a propagation operation to propagate the modifications to the target table according to the nature of the modifications to the base table, the propagation operation selected from the group consisting of an insert operation, an update operation, a delete operation, a renaming relation operation; and a drop table operation.

27. The article of manufacture of claim 23, wherein propagating the modifications into the target table further comprises, when the base table is mapped to the target table using a split operator, selecting a propagation operation to propagate the modifications to the target table according to the nature of the modifications to the base table, the propagation operation selected from the group consisting of an insert operation, an update operation, and a delete operation.

28. The article of manufacture of claim 23, wherein propagating the modifications into the target table further comprises, when the base table is mapped to the target table using a split operator, to select a propagation operation to propagate the modifications to the target table according to the nature of the modifications to the base table, the propagation operation selected from the group consisting of an insert operation, an update operation, a delete operation; and a column renaming operation.

29. The article of manufacture of claim 23, wherein mapping the base table into the target table comprises mapping the base table into the target table using Schema SQL view definitions.

30. The article of manufacture of claim 21, wherein at least one of the base table and the target table are remote to the database management program.

* * * * *